W. H. LASSWELL.
SPRING HUB.
APPLICATION FILED MAR. 20, 1913.
1,086,922.
Patented Feb. 10, 1914.
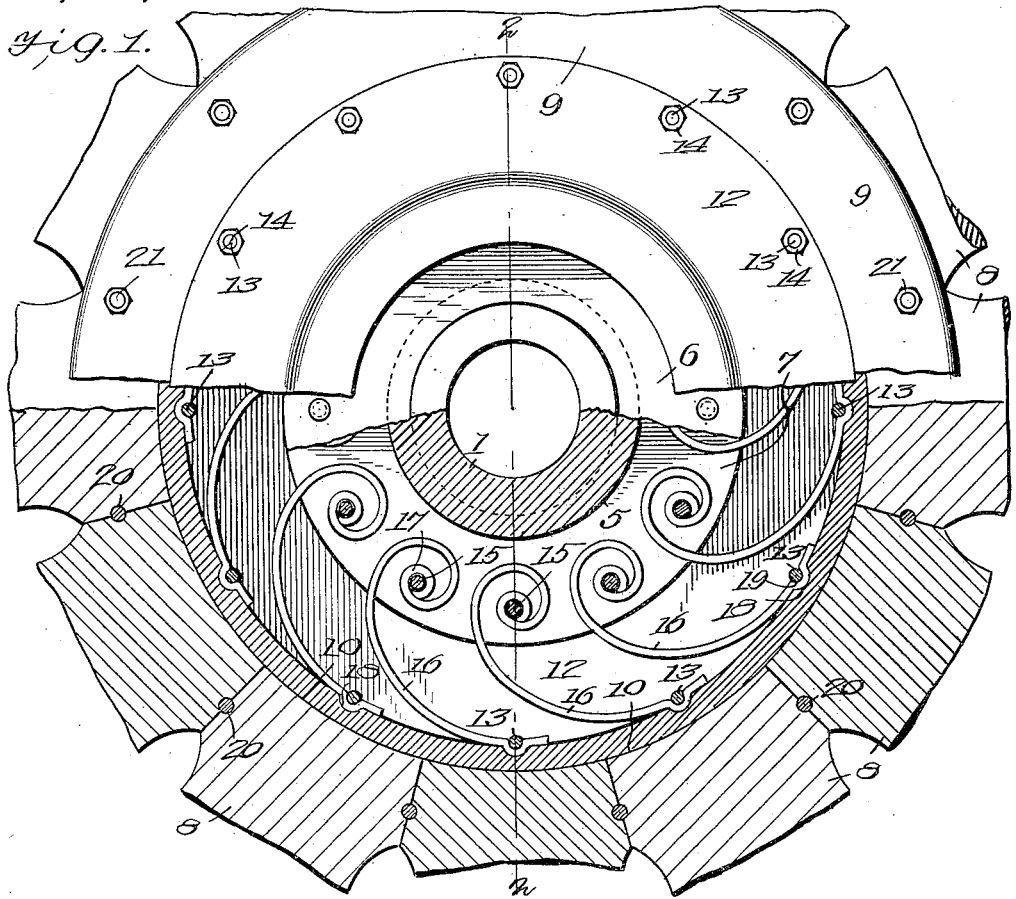
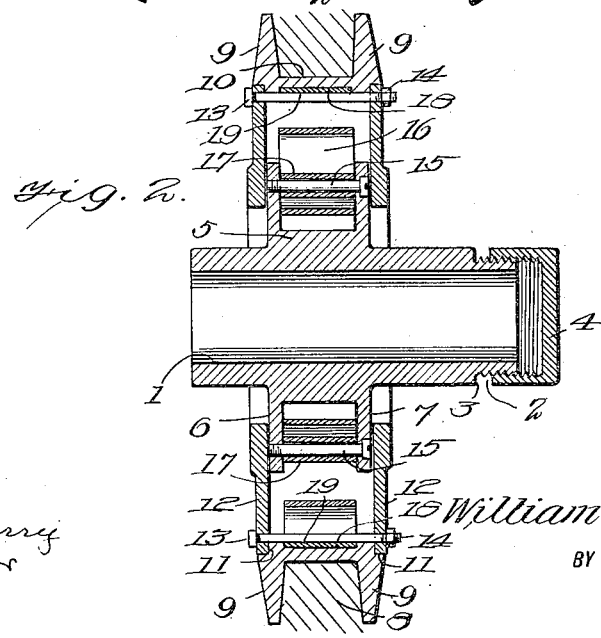
WITNESSES
F. C. Barry
C. E. Trainor
INVENTOR
William H. Lasswell
BY Munn & Co.
ATTORNEYS

UNITED STATES PATENT OFFICE.

WILLIAM H. LASSWELL, OF SAN ANTONIO, TEXAS, ASSIGNOR OF TWO-THIRDS TO JOHN F. MONTGOMERY, OF SAN ANTONIO, TEXAS.

SPRING-HUB.

1,086,922.　　　Specification of Letters Patent.　　Patented Feb. 10, 1914.

Application filed March 20, 1913.　Serial No. 755,651.

*To all whom it may concern:*

Be it known that I, WILLIAM H. LASSWELL, a citizen of the United States, and a resident of San Antonio, in the county of Bexar and State of Texas, have made certain new and useful Improvements in Spring-Hubs, of which the following is a specification.

My invention is an improvement in spring hubs, adapted for use in automobiles and other vehicles, wherein yielding mechanism is provided within the hub, between the spindle and the wheel, for cushioning the vehicle against jar and jolting from inequalities in the road surface, and wherein yielding mechanism is concealed from view and protected from external injury and the entrance of dust and the like.

In the drawings: Figure 1 is a side view of the hub of a wheel constructed in accordance with the invention, a part of the hub being in section; and, Fig. 2 is a section on the line 2—2 of Fig. 1.

The present embodiment of the invention comprises a sleeve 1 having its outer end reduced externally and screw threaded at 2, an annular shoulder 3 being formed between the threaded portion and the body of the hub, and the said threaded portion is adapted to be engaged by a cap 4, for closing the outer end of the sleeve.

The sleeve is designed to receive the spindle of the axle, and the said sleeve is provided near its inner end with an annular rib or enlargement 5, and with radial flanges 6 and 7 at each end of the said rib, the flange 6 being at the inner end of the enlargement, and the flange 7 at the outer end.

The spokes 8 are received between the flanges 9 of a ring 10, the said ring being coaxial with the sleeve, and the flanges 9 extend radially from the side edges of the ring. Each flange has its side walls beveled, as shown in Fig. 2, so that the groove or channel between the flanges for receiving the spokes is of lesser width at its bottom than at its top.

The ring 10 is annularly enlarged or rabbeted at each side of its inner face, as indicated at 11, and housing plates in the form of rings 12 are arranged upon each side of the said ring, the outer edge of each of the said plates fitting within the adjacent rabbeted portion 11, and bolts 13 are passed through the flanges, at spaced intervals, and are engaged by nuts 14 to clamp the outer edges of the plates against the rabbeted portions of the ring 10.

The inner edges of the plates 12 fit outside of the flanges 6 and 7, and the said flanges are slidable on the inner faces of the housing plates. The internal opening of the housing plates is of such diameter that the sleeve 1 may move freely radially of the housing plates, without engaging the said inner edges of the plates. The flanges 6 and 7 are connected at spaced intervals near their peripheries by cross bolts or screws 15, each of the said bolts or screws having its head countersunk in the outer face of the flanges 7, and the opposite end of the bolt is flush with the outer face of the flange 6. The bolts 15 correspond in number to the bolts 13, and each bolt 13 is in radial alinement with a bolt 15.

A plurality of springs 16 are arranged between the bolts 13 and 15, one of the said springs being arranged between each pair of the said bolts. Each spring has its inner end bent to form a ring 17 encircling a bolt 15, and the said spring is then bent to partially encircle the ring 17 in spaced relation, and the outer end of each spring is received between a bolt 13 and the inner face of the ring 10.

The inner face of the ring 10 is recessed transversely, as indicated at 18, at each bolt 13, and the outer end of each of the springs 16 is provided with a transverse groove 19 on the inner face of the spring, which forms a transverse rib on the outer face, and each of the ribs is received in a groove 18, one of the bolts 13 fitting each groove 19 of the spring.

Each of the springs 16 has its inner end engaged with the bolt 15 of one pair of radially alined bolts 15—13, and its outer end with the bolt 13 of the pair of radially alined bolts 13—15 immediately in rear thereof. The springs 16 are similar in shape, and are similarly arranged, and the said springs are between the housing plate 12 and between the flanges 6 and 7 of the sleeve 1. The sleeve 1 may be thus moved freely radially with respect to the ring 10, within limits prescribed by the springs 16. Bolts 20 are passed through the flanges 9 of the ring 10 between each pair of adjacent spokes, and the said bolts are engaged by nuts 21 to hold the flanges and the spokes in proper relation.

The inner ends of the spokes are curved to fit the outer face of the ring 10, and the bolts 20 and the flanges 9 prevent disengagement of the said spokes from the ring 10.

The device consists in fact of concentric hubs and springs between the hubs normally holding them in spaced relation, to permit the said hubs to yield with respect to each other. The springs 16 are inserted in their normal shape, without compression, so that the load on the inner hub will be distributed equally and uniformly among the springs, which are twelve in number in the present instance, although it is obvious that a greater or less number may be used in accordance with the type of wheel.

I claim:—

1. In combination, a sleeve provided with radially extending flanges intermediate the ends of the sleeve, said flanges being spaced longitudinally of the sleeve, a ring for connection with the spokes of a wheel, are springs arranged between the hub and the ring, each spring having its inner end arranged between the flanges and secured thereto and having its outer end fitting against the inner face of the ring, means for securing the said end of each spring to the ring, and housing plates connected with the ring at each side thereof and extending inwardly beyond the outer edge of the adjacent flange, the said ring being rabbeted to receive the outer edge of each housing plate, bolts connecting the flanges of the ribs at spaced intervals, each spring having its inner end connected to a bolt, the means for securing the outer ends of the springs to the ring comprising bolts extending through the housing plates at the ring and clamping the said plates to the ring, the outer end of each spring having a transverse groove and the ring having a transverse groove at each of the said bolts for receiving the groove of the spring.

2. In combination, a sleeve having annular radial flanges intermediate its ends and spaced apart from each other, a ring for connection with the spokes of a wheel, are springs arranged between the hub and the ring, each spring having its inner end arranged between the flanges and secured thereto and having its outer end fitting against the inner face of the ring, housing plates arranged at each side of the ring and extending inwardly toward the flanges, bolts extending through the housing plates at the surface of the ring and clamping the said plates against the ring, the outer end of each spring having a transverse groove and the ring having a transverse groove at each of the bolts for receiving the groove of the spring, to prevent displacement of the outer end of the spring.

WILLIAM H. LASSWELL.

Witnesses:
ABE WISE,
J. W. MUNCEY.

Copies of this patent may be obtained for five cents each, by addressing the "Commissioner of Patents, Washington, D. C."